Aug. 26, 1969    C. B. McGREW, JR    3,463,435
SUN VISOR RETAINER FOR AUTOMOTIVE VEHICLES
Filed Nov. 2, 1967
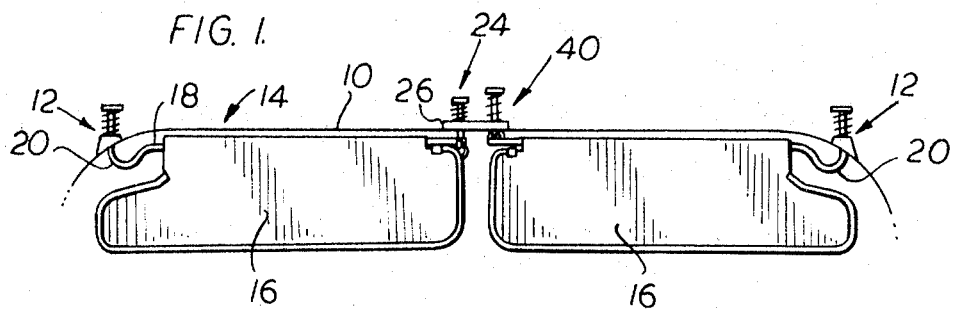
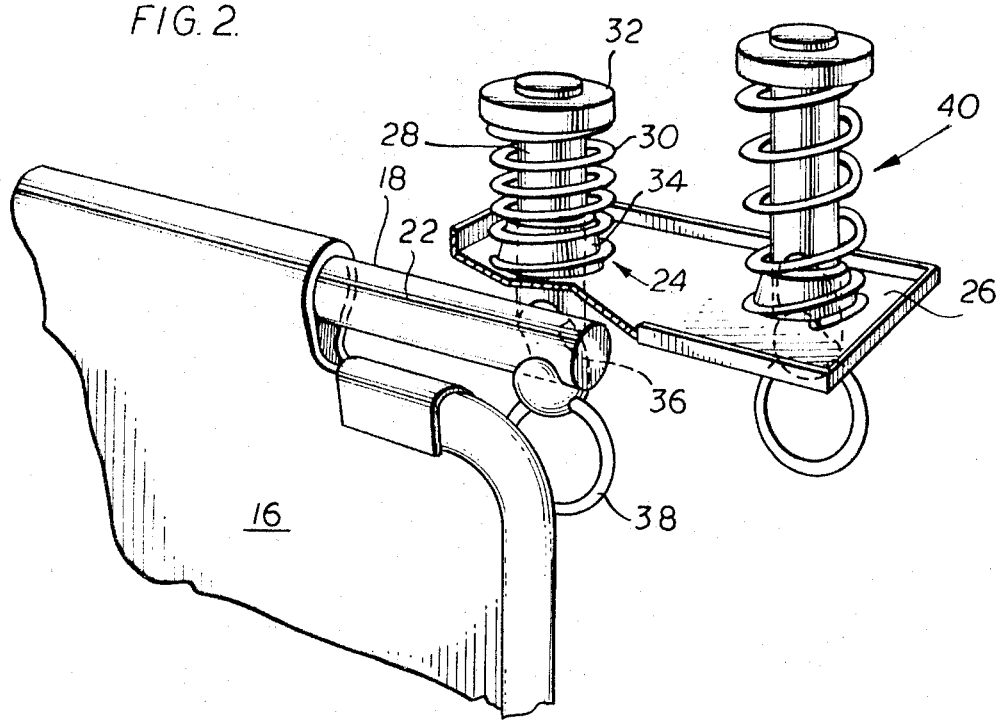
INVENTOR
CHARLES B. MC GREW JR.
ATT'Y

United States Patent Office 3,463,435
Patented Aug. 26, 1969

3,463,435
SUN VISOR RETAINER FOR AUTOMOTIVE VEHICLES
Charles B. McGrew, Jr., Fort Wayne, Ind., assignor to International Harvester Company, Chicago, Ill., a corporation of Delaware
Filed Nov. 2, 1967, Ser. No. 680,119
Int. Cl. F16b 45/00; E04g 17/18; B60j 3/00
U.S. Cl. 248—305
4 Claims

ABSTRACT OF THE DISCLOSURE

Releasable retaining means for securing the swingable support arm of an automobile sun visor when the sun visor is in a normal position. The retaining means includes a slidably supported shaft member which is capable of moving between an extended position where it is capable of operatively engaging the sun visor support arm so as to secure the same in its normal position and a released and retracted or non-projecting position wherein it is substantially withdrawn from the interior of the automobile body.

---

This invention relates to sun visors for motor vehicles and more particularly to the sun visor support or retaining means.

A common method of securing the free end of the sun visor mounting shaft is to permit it to rest in a U-shaped hook or other protruding retaining means which may be connected to the headliner surface or the windshield header panel. This type of retaining means and others often suffer from one or more of the following deficiencies. First, the retaining means may not hold the end of the visor rod too securely, so that movement of the vehicle shakes the visor out of its retained or stored position. Second, the retaining means usually being a projecting object contributes to potential injury in case of accidents.

An object of the present invention is to provide a visor retaining means which will solidly support the sun visor shaft and prevent it from being jarred out of place due to road shocks, etc.

A further object of the present invention is to provide a sun visor support or retaining means which presents a minimum hazard to safety of the vehicle's occupants.

Another object is to provide a sun visor retaining means which is retractable when not being used.

The above and other objects and advantages of the invention will become more apparent when considered in conjunction with the following drawings in which:

FIGURE 1 illustrates the general arrangement of sun visors mounted in a vehicle and retaining means embodying the invention herein; and FIGURE 2 is an enlarged perspective view of the sun visor retaining means shown in FIGURE 1, one retaining means being shown in a latching position and a second being shown in a retracted position.

Referring now to the drawings in which like reference characters designate similar parts, 10 designates the headliner surface of an automotive vehicle on which is mounted a sun visor bracket 12 in which a sun visor assembly 14 is pivotally supported. The sun visor assembly 14 may be of conventional construction comprising generally a sun visor 16 and a sun visor support arm 18 fitted in the top edge of the visor 16 and protruding from each end thereof. One end 20 of the support arm 18 is pivotally supported in the bracket 12 and the other end 22 is the free end which is adapted to engage a support arm retaining means 24. The inventive features reside in this retaining means 24.

The retaining means 24 mounted on a base member 26 comprises a shaft member 28 extending through and mounted for slidable up and down movement in the base member 26, spring biasing means 30 surrounding the shaft member 28 and spring retainer means 32 on the upper end of the shaft member 28. The base member 26 may be secured to the headliner or windshield header by a suitable conventional means. The base member 26 has a boss 34 formed thereon in which is formed an opening to slidably receive shaft 28. The spring biasing means 30 in the form of a helically wound compression spring closely surrounds the boss 34 and upper portion of the shaft 28 and is positioned between the upper surface of the base member 26 and the spring retainer means 32 which may be in the form of a flange formed on the shaft 28. It will be appreciated that the boss 34 serves to maintain the lower end of the spring 30 in its proper position and prevents inadvertent side shifting thereof with respect to the base member 26. The spring 30 is a compression spring and urges the shaft 28 upwardly as viewed in FIGURE 2.

The lower end of shaft 28 is formed with a notch or recess 36 which is adapted to receive the end 22 of the sun visor support arm to latch the support arm in place. It firmly retains the end 22 to diminish the possibility of the support arm 18 being jarred loose during rough driving conditions. When the support arm end 22 is not engaged by the notch 36, as when the visor is moved, for example, to a position along the door window, the spring 30 urges the shaft 28 upwardly out of the way so that it does not present a dangerous projecting piece of metal. This retracted position is illustrated by the assembly 40. The spring 30 may be selected to urge the shaft 28 an appropriate distance upwardly. The lower end of shaft 28 is equipped with a suitable finger pull 38 for pulling the shaft 28 downwardly into position to support arm 18. The pull 38 illustrated is in the form of a ring which is pivotally connected to the lower end of the shaft 28. The diameter of the pull 38 is greater than the diameter of the cavity or recess defined by the boss 34 and, consequently, the pull 38 engages the base member 26 to limit movement of the shaft member 28 in one direction and in this manner the retracted position of the shaft member 28 is established.

A second retaining means 40 may also be mounted on the base member 26 for retaining a visor support arm associated with a visor on the rigt side of the vehicle. Retaining means 40 is in all respects similar to retaining means 24 and accordingly need not be described in detail.

It will be apparent that this invention provides unique means for firmly positioning the sun visor and is so constructde that when not in use, it advantageously assumes a retracted position to lessen the dangers often presented by projecting objects in a vehicle.

While a preferred embodiment of the invention has been specifically disclosed, it is to be understood that the invention is not limited thereto as other variations will be apparent to those skilled in the art and the invention is to be given its fullest possible interpretation within the terms of the following claims.

I claim:
1. Releaseable retaining means for securing the swingable support arm of an automobile sun visor in one position of adjustment comprising:
   a generally flat, plate-like base member having an opening formed therethrough;
   visor latch means supported by said base member for relative sliding movement through said opening between an extended position wherein a portion thereof projects from one side of said base member and a retracted position wherein said latch means is withdrawn through said opening and is substantially disposed on the side of said base member opposite said one side, said latch means including notch means formed on said projecting portion operatively engageable with the visor support arm when said latch means is in its extended position;

biasing means for yieldably urging said latch means toward its retracted position; and finger pull means attached to said latch means adjacent to said notch means to facilitate manual movement of said latch means from its retracted position to its extended position.

2. Releasable retaining means as set forth in claim 1, wherein said latch means includes a generally cylindrical, elongated shaft memebr and said shaft member is slidable with respect to said base member through said opening along its longitudinal axis; said biasing means being in the form of a helically wound compression spring, said shaft member extending longitudinally through said spring, and said base member being formed with a generally circular boss in the area of said opening, said boss projecting into the lowermost end of said spring and serves to prevent dislodgement thereof with respect to said base member.

3. Releasable retaining means as set forth in claim 2, wherein said shaft member is provided with an annular spring retainer at the end thereof opposite said notch means for receiving one end of said compression spring.

4. Releasable retaining means as set forth in claim 3, wherein said finger pull means is in the form of a generally circular ring and has an arcuate section thereof pivotally connected to said shaft member adjacent said notch means, said circular ring having a diameter greater than the diameter of said base member opening.

References Cited

UNITED STATES PATENTS

| | | |
|---|---|---|
| 748,541 | 12/1903 | Sullivan. |
| 1,599,183 | 9/1926 | Phillips _____ 296—97 |
| 2,288,305 | 6/1942 | Traumuller _____ 248—307 |

ROY D. FRAZIER, Primary Examiner

J. FRANKLIN FOSS, Assistant Examiner

U.S. Cl. X.R.

248—339; 296—97